United States Patent
Javaherian

(12) 
(10) Patent No.: US 6,360,726 B1
(45) Date of Patent: Mar. 26, 2002

(54) FUEL VOLATILITY DETECTION AND COMPENSATION DURING COLD ENGINE START

(75) Inventor: Hossein Javaherian, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/630,313

(22) Filed: Jul. 31, 2000

(51) Int. Cl.$^7$ ............................................. F02D 41/06
(52) U.S. Cl. ........................ 123/491; 123/435; 73/116
(58) Field of Search .................................. 123/435, 436, 123/478, 480, 486, 179.5, 179.16, 491; 73/117.3, 118.1, 116

(56) References Cited

U.S. PATENT DOCUMENTS

| | | | |
|---|---|---|---|
| 4,619,237 A | * 10/1986 | Auslander et al. | 123/491 |
| 5,146,882 A | * 9/1992 | Brinkman et al. | 123/179.5 |
| 5,419,296 A | * 5/1995 | Yamura | 123/435 |
| 5,582,157 A | 12/1996 | Uchikawa | 123/676 |
| 5,586,537 A | 12/1996 | Tomisawa et al. | 123/435 |
| 5,701,868 A | 12/1997 | Tomisawa | 123/406.53 |
| 5,711,272 A | 1/1998 | Maegawa et al. | 123/406.53 |
| 5,894,832 A | * 4/1999 | Nogi et al. | 123/491 |
| 5,915,359 A | 6/1999 | Meyer et al. | 123/436 |
| 6,178,949 B1 | * 1/2001 | Kirwan et al. | 123/435 |

* cited by examiner

Primary Examiner—Willis R. Wolfe
(74) Attorney, Agent, or Firm—George A. Grove; Jeffrey A. Sedlar

(57) ABSTRACT

An adaptive same-ignition-cycle passive method is disclosed for the real-time detection and compensation of fuel volatility (or equivalently, the fuel driveability index, DI) during cold start of a multi-cylinder engine. The method detects a signature of fuel volatility on engine speed (rpm) immediately after engine starts to run. In accordance with this method, a local short-duration high-amplitude speed droop is associated with fuels of various volatility which can be detected within the first second after engine ignition while engine is in idle-neutral operation mode. The speed droop is uniquely correlated with the fuel DI value in the form of calibration tables at different temperatures. The actual fuel DI is thus detected and the optimum fuel enrichment/enleanment is quickly determined within few events after engine is flagged as running even before the transmission is engaged (vehicle still in P/N mode). Hence, optimum tradeoff between vehicle driveability and low tailpipe emissions is simultaneously achieved on-line.

12 Claims, 10 Drawing Sheets

$Z_i = Z(t = t_i)$, $N_{avg} = (Z_{i+1} + Z_i)/2$ : AVERAGE SPEED OVER $T_i$ $r_i = r(i) = \dfrac{Z_{i+1} - Z_i}{N_{avg} \cdot T(i)} = \dfrac{2(Z_{i+1} - Z_i)}{(Z_{i+1} + Z_i) \cdot T(i)}$ A/F Vs. Fuel Volatility Calibration C-Curve Speed Droop as a Measure of Fuel Volatility

FUEL VOLATILITY DETECTION AND COMPENSATION DURING COLD ENGINE START

TECHNICAL FIELD

This invention relates to a process to be executed with the microprocessor of a vehicular engine- or powertrain-control module for determining the volatility of a gasoline fuel for use in adjusting air-to-fuel ratio during cold engine start.

BACKGROUND OF THE INVENTION

Despite the development of catalytic converters for the treatment of exhaust gases from automotive internal combustion engines and sophisticated computer-based controls for engine spark timing and air-to-fuel ratio management, there remains a need for improvement in reducing emissions during the starting and warm-up of a cold engine. A significant amount of carbon monoxide and unburned hydrocarbon emissions is exhausted to the atmosphere during the first minute or so of start up and operation of a cold gasoline-powered engine when the catalyst has not reached its light-off temperature. The actual temperature of a "cold" engine may vary greatly depending upon the ambient conditions, but even a tropic environment does not heat an engine and exhaust system to their effective operating regime. During a cold start, the noble metal-based catalytic converter is not hot enough to affect the oxidation of incompletely burned fuel. Furthermore, it is difficult to adjust the air/fuel ratio in the engine because the oxygen sensor in the exhaust system is not warmed up, and there is no information available to the engine controller concerning the ratio of air to fuel being admitted into the cylinders for combustion.

The amount of liquid fuel being introduced into the engine can be controlled by the activation times of the engine's calibrated fuel injectors. But during cold start, only a portion of the injected fuel actually vaporizes for efficient combustion, and that portion depends largely on the volatility of the fuel being delivered to the cylinders of a cold engine.

Commercial fuel volatility varies by season and location. Usually, lower volatility fuels are supplied in the summer and warmer locations. To avoid driveability problems at lower temperatures, higher volatility fuels are provided in winter. Such fuel volatility variation, however, is a cause of concern for the auto industry in regard to both emissions compliance and good driveability for customer satisfaction. Designers of automotive vehicles have to provide engine controls and calibrations that enable rapid and smooth engine start-up to satisfy the customer, and such controls and calibrations must also lead to ever lower exhaust discharges of carbon monoxide and incompletely burned fuel species. Indeed, the design of engine controls would have been simpler had the actual volatility of the fuel used in the vehicle were known to engine controller in real time.

A well-recognized measure of fuel volatility is the familiar Driveability Index (DI)

$$DI=1.5T_{10}+3T_{50}+T_{90}$$

where $T_{10}$, $T_{50}$ and $T_{90}$ represent temperatures in °F. at which 10%, 50% and 90%, respectively, of fuel has vaporized during ASTM D86 distillation test. It is seen by inspection of the above equation that high volatility fuels have lower DI values and vice versa. In general, fuels with higher DI values, i.e., lower volatility properties, are harder to start and may cause rougher engine operation during warm-up.

Current engine computer control strategy is to calibrate engines for low-volatility fuel (worst case scenario) to avoid potential engine stall and/or driveability problems with lower volatility fuels in the market. This requires significant fuel enrichment during the initial cold-start transient phase of engine control and operation. In such a fuel-blind calibration procedure, the emission levels for high-volatility fuels (used in most emission certification tests) are much higher than would otherwise be possible. On the other hand, had the engine been calibrated for the certification fuel, there could have been driveability problems in real-world vehicle operation and hence potential customer complaints. Thus, an adaptive engine control strategy based on real-world estimation of DI would help both emissions and driveability.

In the absence of a reliable and cost-effective sensor for direct measurement of fuel volatility, optimal fuel control during initial cold-start transients is a difficult task. Without knowledge of how much vaporized fuel is being pumped into the combustion chamber of the engine during cold start, control of the proportions of air and fuel is difficult, if not impossible. With the lack of knowledge of fuel DI, all current engine control strategies have resorted to a conservative high DI calibration base. This assures a fuel rich start-up for driver satisfaction but with increased exhaust emissions. As a result, in practice, on some systems additional costly after-treatment processes (such as the Air Injection Reactor system) are added to the emissions control system to reduce non-methane hydrocarbons (NMHC) and carbon monoxide (CO) to acceptable levels given by the relevant mandated emission standards.

It is clear that there is a significant need for a soft sensor or computer-based process for the real time detection of fuel volatility, especially during cold engine start, to insure simultaneous customer driveability satisfaction and compliance with emissions standards.

SUMMARY OF THE INVENTION

This invention provides a generic process for detecting the fuel volatility, or equivalently the driveability index DI, of the gasoline actually being pumped to and injected into the intake port or the combustion cylinders of a vehicle engine during start-up. The invention also provides a compensation process for adjusting or compensating for the low volatility fuel-based calibration with a reliable estimate of the actual volatility of the fuel in establishing the rate of fuel injection to the engine. These detection and compensation processes are preferably carried out within about one second of engine start-up using crankshaft position sensor information (raw rpm data) in the suitably programmed engine control module or powertrain control module of the vehicle.

When a vehicle operator turns the ignition key to start a current gasoline-powered, internal combustion engine (preferably without touching the throttle pedal) under the management of an engine or powertrain control module, the starter motor cranks the engine a few revolutions to enable starting. The powertrain control module (PCM) is activated. It has been pre-calibrated to control the ignition system and air and gasoline flow to start the cold engine. As part of its operation, the PCM receives and processes raw signals from the crankshaft position sensor to time ignition events and ascertain engine start and idle. During the first few events after cranking, fuel is injected into the air inlet ports of all cylinders (asynchronous fuel injection) until the PCM has processed sufficient sensor data to learn crankshaft position. Synchronous fuel injection then begins. The mass of fuel injected per port has been predetermined by the calibration of the engine control designer, but the amount of fuel vapor actually available for combustion in any given engine depends mostly on the actual volatility of the fuel at the ambient temperature.

The proportion of vapor generated by the injected fuel is relatively low in low volatility (high DI) fuels and relatively high in high volatility (low DI) fuels. The PCM has been calibrated to inject a relatively large mass of fuel because of the designer's assumption that the vehicle may contain a low volatility fuel. The fuel-rich engine quickly starts idling. As soon as the PCM detects the engine run condition, the rate of fuel injection is sharply cut back over a specified number of engine ignition or fuelling events. The engine is now operating in a more fuel-lean condition and engine speed in revolutions per minute (rpm) decreases to a pre-specified level.

As stated, a part of PCM operation involves noting and counting engine events and the time between them. An engine event refers to the timing of ignition or fuel injection into a cylinder. A fuel injection may be into a fuel port for a cylinder or directly into the cylinder. An event period is the time in milli-seconds between two successive injections or ignitions in a multi-cylinder engine.

This invention utilizes the fact that as the PCM alters engine operation from a fuel-rich to a fuel-lean operating regime, there is a drop in the actual amount of fuel vapor available for combustion in the cylinders of the engine. As stated, during the initial transient cold start, the actual fuel vapor in the cylinders of an IC engine depends both on the amount of fuel injection and also on the fuel volatility. Furthermore, it is found that an abrupt cutback in the level of fueling will result in different vapor dynamics for fuels with different volatility.

It is observed that the vapor drop, due to fuel cutback after cranking, is higher for fuels with higher volatility. As the engine torque (or power) level is proportional to the actual level of fuel vapor burned in the cylinders, it had been expected and found by this inventor that there is a larger torque drop (here called "torque hole") for more volatile fuels immediately after an abrupt fuel cutback. Associated with the torque hole is also the corresponding speed drop (with its magnitude called "speed droop" in this specification), the actual value of which is easily measured by timing signals from the crankshaft position sensor. Therefore, in accordance with this invention, the speed droop following an abrupt fuel cutback during the initial cold-start transients is a useful and reliable measure of fuel volatility.

In practice, in all engine cold-start strategies, larger fuel enrichment is initially used to get the engine started. This is then followed by some schedule for fuel cutback. This fuel schedule (internal to the PCM) is exploited in the practice of this invention to detect the fuel volatility without the use of any additional sensors or external probing signals. The detection of fuel volatility from speed droop data in the first second or so after the ignition key is turned on is then used to compensate for actual fuel volatility. Subsequent injection of fuel during the engine and exhaust warm-up period (until the exhaust oxygen sensor is warmed up and closed loop fuel control by the PCM is enabled) is based on the estimated fuel volatility rather than the pre-calibrated fuel-rich value.

With respect to the fuel volatility compensation step, it is preferred to experimentally determine the air/fuel ratio enrichment thresholds for representative fuels over a range of potential cold start temperatures. A calibration table is established for a specific family of engines. This practice is a reliable way of operating the engine control system near its peak potential for reduced emissions without driveability risks. For every engine family and fuel DI (e.g., DI values ranging from 1100° F.–1300° F. in steps of 25° F.) and at any given temperature (−50° F. to 120° F. with emphasis at 50° F.), the optimum A/F enrichment is determined that avoids engine stall and provides good driveability. The data is stored in the form of look up tables in the PCM memory. This is illustrated in the C-curve in FIG. 8.

Speed droops during cold starts for representative gasoline fuels are correlated with their fuel DI values. These DI values and associated speed droops, for a range of applicable temperatures, are also stored in lookup tables accessible by the PCM. For example, see D-curve in FIG. 9. Then during an actual cold start, once the PCM has detected the speed droop following engine start and fuel cutback, the PCM refers to the lookup table for the determination of the proper fuel volatility. Upon estimation of fuel volatility from D-curve table lookups, the PCM uses the C-curve table lookup to determine the optimum fuel/air enrichment. Subsequently, the required degree of fuel enrichment is used by the PCM and the fuel injection is appropriately adjusted.

Other objects and advantages of this invention will become apparent from a detailed description of a preferred embodiment that follows. Reference will be made to figures described in the next section of this specification.

DESCRIPTION OF THE PREFERRED EMBODIMENT

Figure 1:
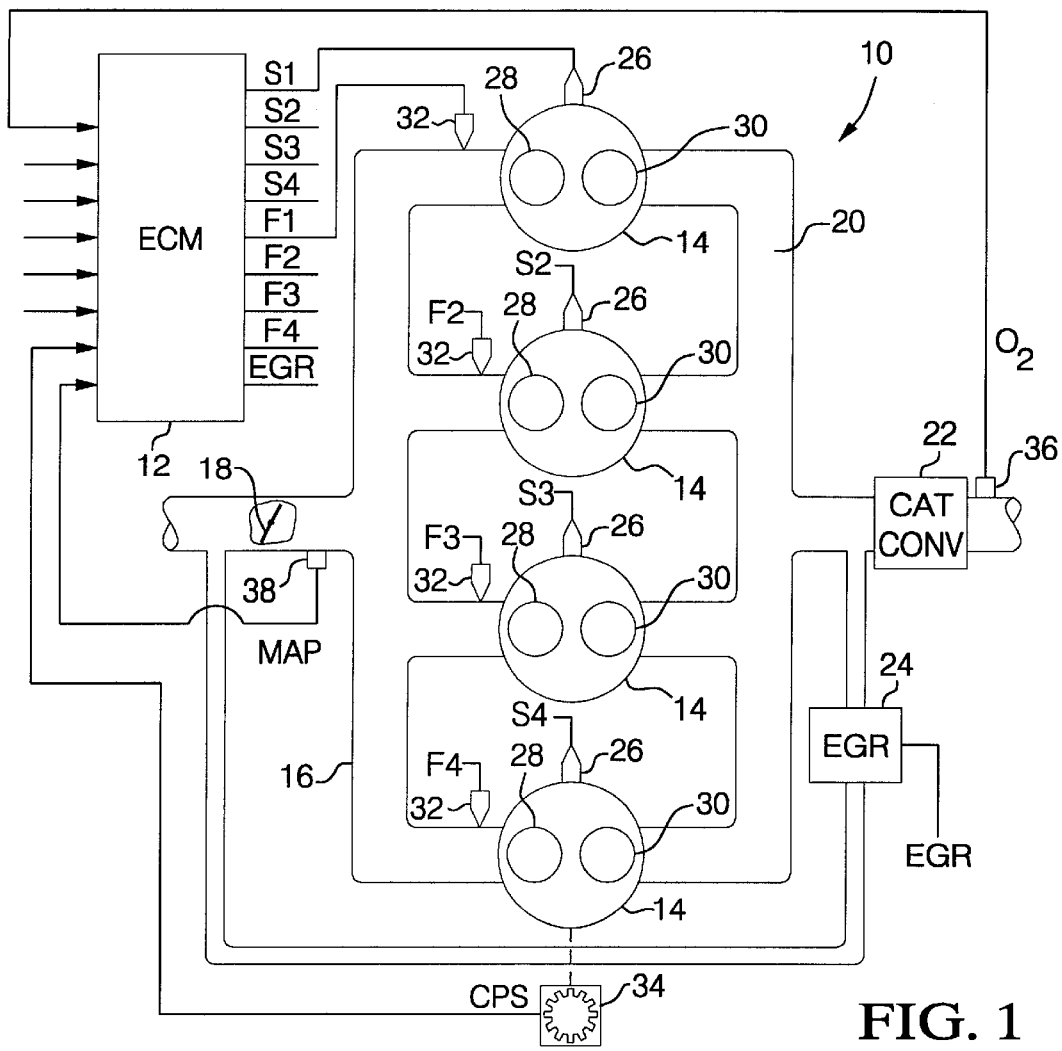
FIG. 1 is a schematic diagram of an engine and engine control system, including a microprocessor-based controller and associated sensors and actuators, for the practice of this invention.

FIG. 1 depicts a motor vehicle internal combustion engine 10 and a microprocessor-based engine control module (ECM) 12. When the control module is programmed to control both engine and transmission operation, it is often called a powertrain control module (PCM). Either module can be used in the practice of this invention and either may be referred to in this specification.

For purposes of illustration, the engine 10 is depicted as having four cylinders 14, an intake manifold 16 with throttle valve 18, and an exhaust manifold 20 with a three-way catalytic converter 22. An exhaust gas recirculation (EGR) valve 24 returns a portion of the exhaust gases from the exhaust manifold 20 to the intake manifold 16. Each cylinder 14 is provided with a spark plug 26, an intake valve 28 coupled to the intake manifold 16, and an exhaust valve 30 coupled to the exhaust manifold 20. Fuel is delivered to the intake manifold 16 at each intake valve 28 by a respective fuel injector 32. In some engines, not shown, fuel is injected directly into each cylinder of the engine.

Although not shown in FIG. 1, each cylinder 14 houses a piston which is mechanically coupled to a crankshaft which in turn provides motive power to the vehicle through a transmission and drivetrain. During rotation of the crankshaft, the piston reciprocates in the cylinder through positions usually characterized by the crankshaft angle with respect to the top-dead-center position of the piston.

The ECM 12 receives a number of input signals representing various engine and ambient parameters, and generates control signals F1–F4 for the fuel injectors 32, S1–S4 for the spark plugs 26, and EGR for the EGR valve 24, all based on the input signals. Conventionally, the inputs include crankshaft (or camshaft) position as provided by a variable reluctance sensor 34, exhaust gas air/fuel ratio as provided by oxygen sensor 36, and intake manifold absolute pressure (MAP) as provided by pressure sensor 38. Other typical inputs include the manifold absolute temperature (MAT), ambient (barometric) pressure (BARO), fuel rail pressure (FRP), mass airflow (MAF), throttle valve position (TPS) and idle air control (IAC) valve position.

For the most part, the control algorithms for generating the fuel and spark control signals are conventional and well known. For example, fuel may be supplied based on MAF, or by a speed-density algorithm, with closed-loop correction based on the feedback of oxygen ($O_2$) sensor 36. This practice works well with engines calibrated to operate either at close to the stoichiometric air/fuel using a production $O_2$ sensor or for non-stoichiometric air/fuel mixture using a wide-range air/fuel sensor. Spark timing may be controlled relative to crankshaft position based on engine speed and throttle position. Under steady state and warmed-up engine conditions, the present closed-loop feedback processes allow the ECM 12 to reasonably control the engine 10 to minimize emissions while maintaining performance and driveability.

Figure 2:
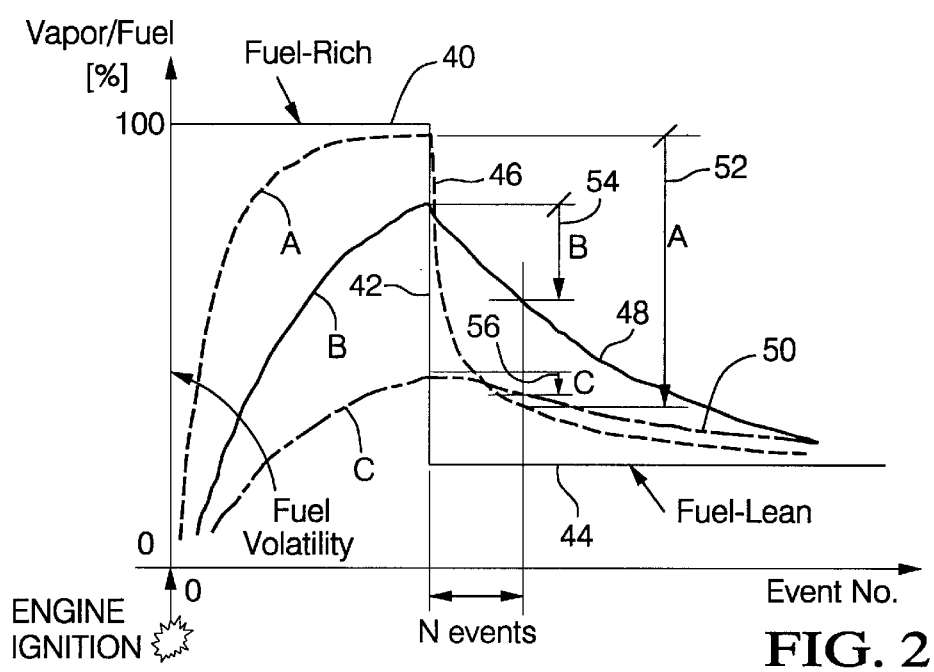
FIG. 2 is a graph showing the dynamics of fuel vapor formation as a percentage of the total fuel injected into the intake port over a period of time measured by a succession of ignition events for three representative fuels of varying volatility.
Figure 3:
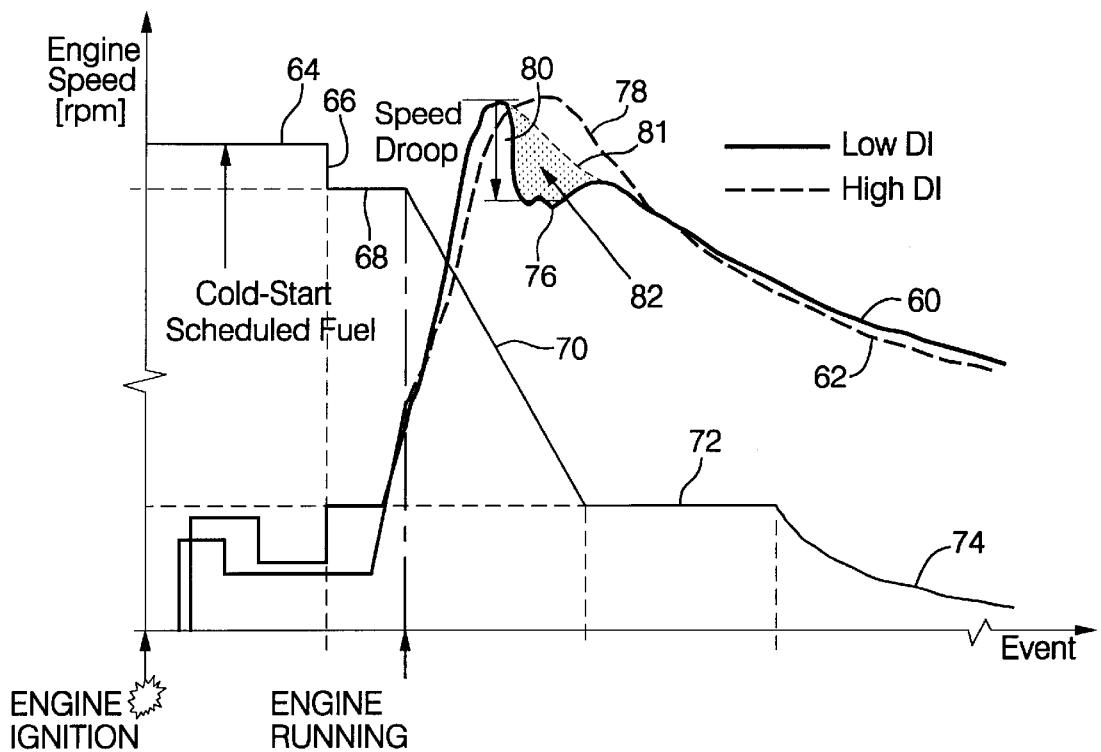
FIG. 3 is a conceptual graph of engine speed or rpm variations during cold start transient phase from first ignition. This graph shows the varying speed droop for a low DI fuel and a high DI fuel.

This invention makes use of the varying response of engine speed or acceleration (a measure of engine torque) immediately following a cold start to fuels of varying volatility. The basis of the invention is illustrated in FIGS. 2 and 3. FIG. 2 is a conceptual graph illustrating the percentage of a fuel entering a cylinder in vapor form during the start-up of a cold engine. The graph reflects the percentage of vapor mass for fuels of different volatility. The vertical axis of the graph represents the percentage of fuel mass in vapor form, and the horizontal axis of the graph represents engine events from the time ignition key is turned on. Horizontal line 40 represents the total amount of fuel injected into the intake manifold of the engine in accordance with a preprogrammed procedure in the powertrain control module for engine start. The amount indicated by line 40 is sufficient to provide a fuel-rich mixture with the air inducted into the engine. This amount of fuel is injected continually over a period of several engine events until engine run mode is detected. Thereafter, the total amount of fuel is rapidly decreased (see line 42) to a lower level (horizontal line 44) at which the proportion of fuel mass to the mass of air is substantially reduced during engine idle and warm-up period. Curve A in FIG. 1 reflects the high percentage of vapor in a relatively high volatility fuel during this fuel-rich and fuel-lean period of operation. Curve B represents the percentage of fuel vapor produced by a somewhat lower volatility fuel. Curve C represents the percentage of fuel vapor produced by a still-lower volatility fuel vapor. Thus, the relative volatility decreases from fuel A to fuel C.

During engine cranking period, for steady throttle and idle-air valve positions, the percentage of vapor in fuel A entering the cylinders increases steadily until a sustained engine speed above a specified level is established. The percentage of vapor in fuel B likewise increases but to a somewhat lower percentage of the total fuel. The percentage of vapor in fuel C increases but to an amount that is significantly less than those produced for fuels A and B.

Once the engine starts running and the engine control module reduces the amount of fuel (line 42), there is a drop in the fuel vapor for the respective fuels. Curve 46 shows the drop in fuel vapor for fuel A, curve 48 shows a less drastic drop in fuel vapor for fuel B, and curve 50 shows the still smaller drop in fuel vapor for fuel C following a drastic reduction in fuel injected in the intake port of the engine. As seen in FIG. 2, after a total of N engine events following the engine run mode detection, the total vapor drop for fuel A is represented by vertical line 52, the total vapor drop for fuel B is represented by vertical line 54, and the total vapor drop for fuel C is represented by vertical line 56. Obviously, the proportion of fuel as vapor in the combustion chamber of the engine affects the combustibility of the air-fuel mixture and the torque output of the engine. This inventor has observed that as the amount of fuel vapor available for mixing with air in cylinders drops, the engine speed also drops accordingly, and this is seen in FIG. 3.

FIG. 3 is a conceptual graph of engine speed variations in rpm versus time or engine event from the occurrence of engine ignition through a time of determination that the engine is running and into the period of engine warm-up. Curve 60 illustrates the engine speed during the cold start transient phase for a high volatility (low driveability index) fuel. Curve 62 is a similar graph for a low volatility or high driveability index fuel during the cold start transient phase. Superimposed on this graph is a plot of typical fuel injection amounts and timings during the cold start transient phase. This superimposed plot will help to explain the reason for the change in the engine speed magnitude with the two fuels having different volatility characteristics. Horizontal line 64 illustrates the relatively large amount of fuel that is injected, first asynchronously and then synchronously, into the cylinders during the cold start. This amount is prescheduled in the engine control module to accommodate whatever fuel the vehicle owner may be using. Once a certain speed level (about 500 rpm) is reached with stable combustion, the amount of fuel is decreased slightly (see vertical line 66). The lesser fuel injection rate (line 68) is maintained for few engine events until the engine is running. Once the engine is running, the amount of fuel is decreased over three or four crankshaft cycles as indicated by line 70 to level 72. After a few events of operation at level 72, the amount of fuel is steadily reduced, as indicated by curve 74, until the engine and the catalytic converter have sufficiently warmed up to activate the closed loop fuel control.

An important feature of FIG. 3 is the response in engine speed after engine starts running and during the fairly rapid decrease in the amount of fuel injection (line 70) in the Figure. It is seen that for the relatively high volatility fuel, there is a rapid drop in engine speed as indicated at region 76. There is also a response in engine speed following the reduced fuel injection rate for the low volatility fuel (see region 78), but the decrease is less precipitous. The total decrease in speed with the high volatility fuel, the speed droop, is represented by line 80. In general, engine torque is a function of cylinder mass flow rate, engine speed, cylinder air/fuel ratio and spark advance. However, during the short test duration after engine run time is established, the average value of these independent variables remain almost steady except for the air/fuel value variations caused by their fuel volatility differences. Cylinder air/fuel differences therefore lead to short-term torque differences for different fuels used. The shape of curve 60 in region 76 has also been described as defining a torque hole 82 (visualized below an imaginary line segment 81 drawn in the actual path of curve 60) due to a relative short-fall in fuel vapor generation following fuel cutback for fuels of higher volatility. It is the engine torque hole or its accompanying speed droop for fuels of varying volatility which are used in this invention to detect the presence of such a fuel.

Figure 4:
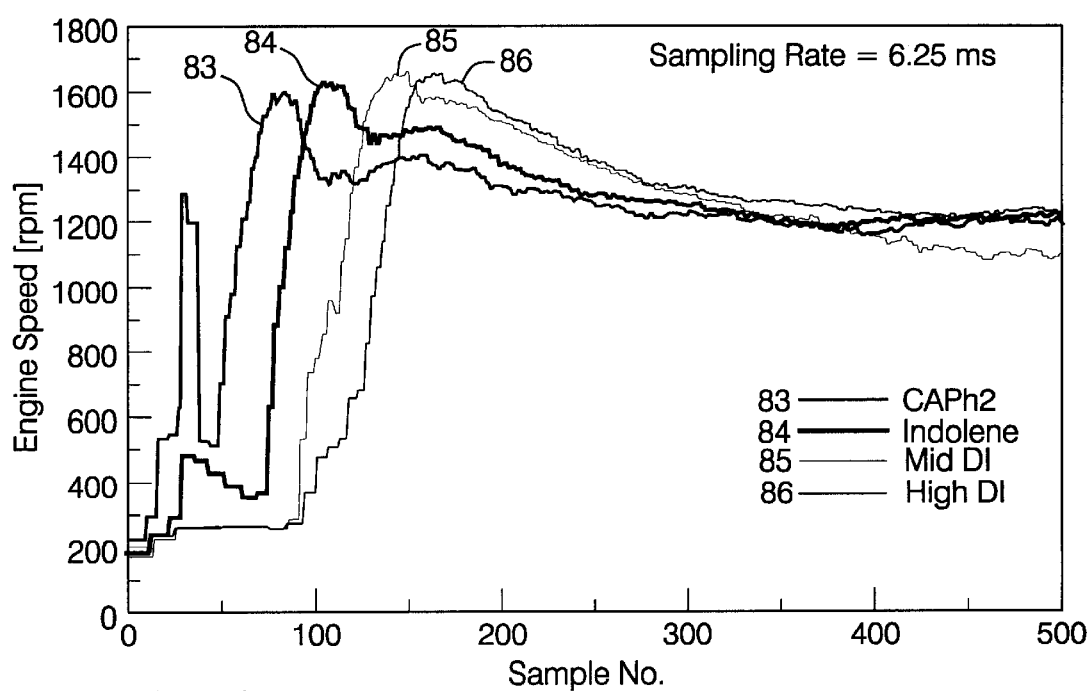
FIG. 4 shows typical experimental graphs of engine speed (in rpm) versus time during cold start transient period for four representative gasoline fuels. In this figure, CAPh2 refers to California Phase II fuel with average DI=1120° F., Indolene refers to EEE federal certification fuel with DI=1160° F., Mid DI=1230° F. and High DI=1285° F.

FIG. 4 is a graph of engine speed versus time for four different fuels of varying fuel volatility (as identified above). Fuel 83 is the highest volatility fuel (lowest driveability index), and fuels 84, 85 and 86 have progressively lower fuel volatility values. It is seen in the rpm curves during cold start transitions using these fuels that the decrease in speed is greatest for the highest volatility fuel 83 and progressively less for the lower volatility fuels 84, 85 and 86.

Figure 5:
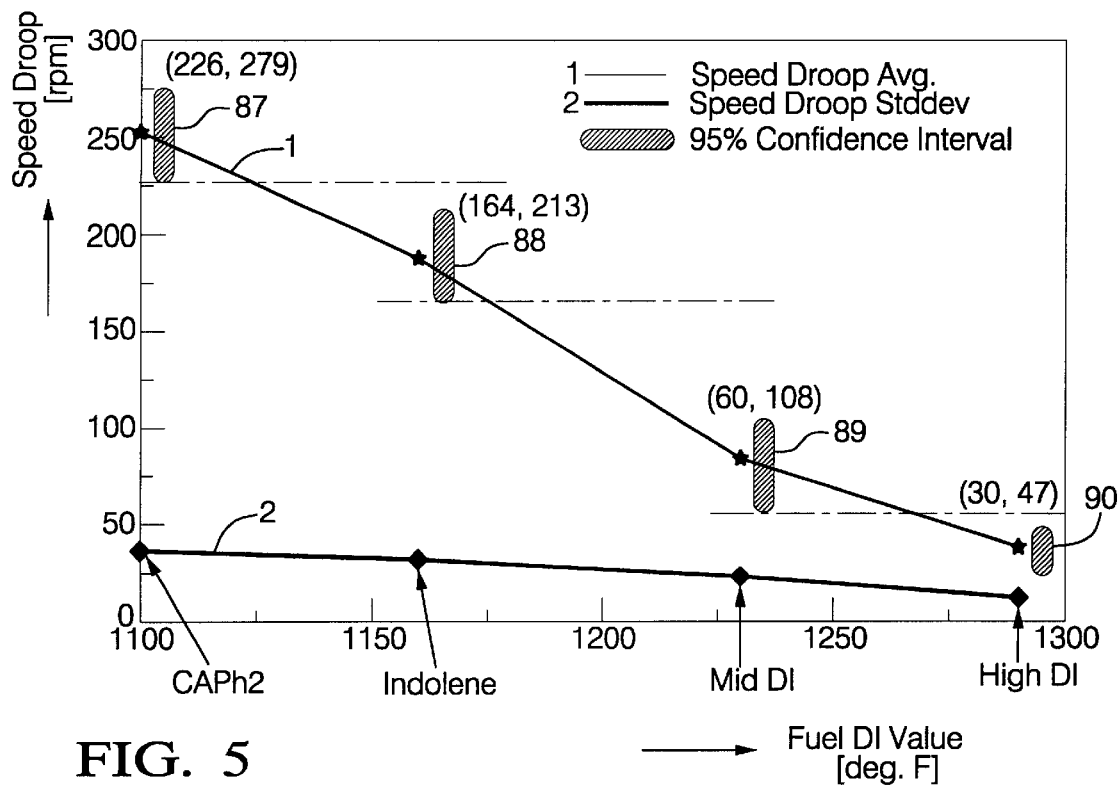
FIG. 5 shows the typical experimental correlation between speed droop and fuel volatility for four representative gasoline fuels obtained during the first second of cold start transients. The graph also shows the speed droop average and standard deviations statistics for fuels of various volatilities.

FIG. 5 is a graph showing variations in the average (curve 1) and the standard deviation (curve 2) in the measured speed droop, for a V6 engine, as a function of fuel volatility. In curve 1, band 87 for fuel 83 shows the 95% confidence level of the relationship in average speed droop in rpm for the high volatility fuel. Band 88 for fuel 84 shows the lesser speed droop for the lower volatility fuel. Similarly, bands 89 and 90 show lower speed droops for the lower volatility fuels. Curve 2 shows the standard deviation of speed droop values for the respective fuels. Thus, the practice of this invention is based on a reproducible and reliable drop in speed that can be correlated with the volatility of the fuel used during the first second of an engine cold start.

Figure 6:
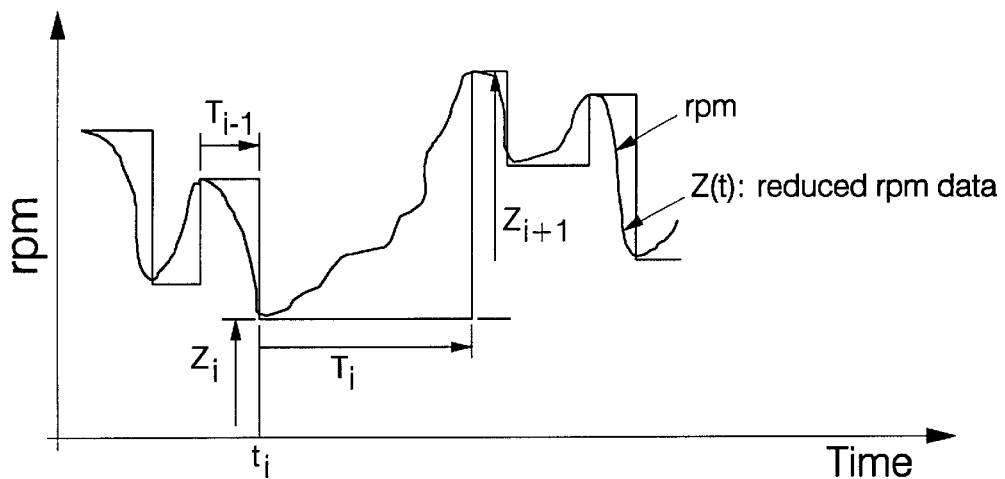
FIG. 6 demonstrates how the actual engine speed may efficiently be reduced to only local peaks and troughs stored in computer memory in real time. While the ECM produces a single rpm value every event, the reduced rpm data Z only searches and stores the actual local minimum and maximum for the purpose of real-time computation efficiency. Moreover, this reduced data set Z will allow more efficient engine acceleration calculation during cold start transition.

For an efficient use of computing resources in the real-time implementation of the algorithm proposed here, the number of rpm samples are reduced by keeping track of only local maximum and minimum in the rpm signal as shown by the values $Z_i$ at event number i in FIG. 6. The reduced data set Z is also used to compute engine speed change represented by the variable r(t) in FIG. 6. The necessary steps to compute engine acceleration r(t), normalized to instantaneous average engine speed, in real time are shown in FIG. 6. In accordance with this embodiment of the invention, the acceleration of the engine during the cold start period is calculated and utilized. As illustrated in this figure, engine speed can be averaged over a particular time period or over a given number of events, and the acceleration or deceleration of the speed calculated by dividing the average speed by the time period or the number of events. This gives incremental values of acceleration. It is found that, within the detection window, the greater the acceleration drop, the higher the volatility of the fuel during this cold start period.

Figure 7:
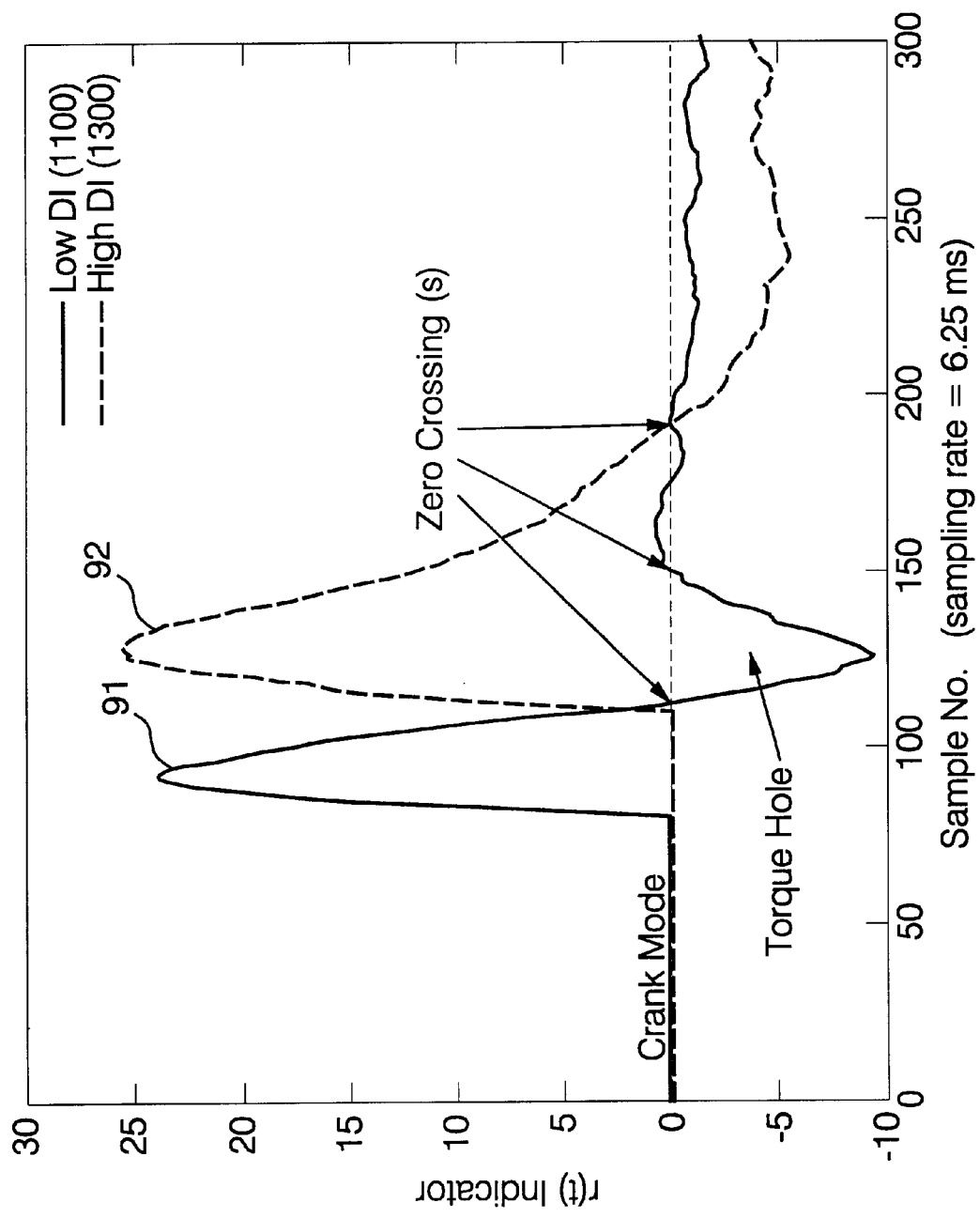
FIG. 7 is an experimental graph of calculated engine acceleration (normalized to average engine speed) versus time in an engine after the engine starts running for high and low volatility fuels.

FIG. 7 illustrates a further practice for utilizing engine acceleration, as a means of determining the fuel volatility online. When the acceleration values r(t) calculated in connection with the process illustrated in FIG. 6 are plotted versus time or engine event, as is done in FIG. 7, it is found that the acceleration signal for the higher volatility fuel as reflected by curve 91 is of higher bandwidth. There are more overshoots and undershoots before the acceleration signal settles. This is equivalent to lower damping and higher natural frequency in the system with higher volatility so that any disturbance such as fuel cutback produces more dynamic effects. Similarly, the acceleration signal represented by curve 92 for a lower volatility fuel is shown in FIG. 7. It is clearly seen in FIG. 7 that higher volatility fuel involves a larger number of zero crossings before settlement. Therefore, there are clear signatures of fuel volatility on rpm and acceleration signals caused by a rapid fuel cutback after the engine starts running. The detection window (in engine event numbers) is usually represented by a given number of events and is related to the duration of fuel cutback in ECM. It is during this detection period that each of the practices of this invention can be utilized to characterize the fuel as a function of the engine speed droop or acceleration (positive or negative).

Figure 9:
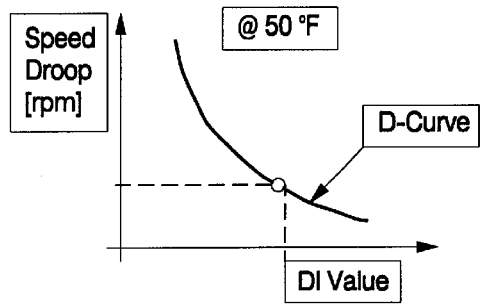
FIG. 9 is a typical graph of speed droop (in rpm) during cold start transition, at any given temperature, in the form of a D-curve table lookup (here D stands for Detection) for future references by the ECM.

FIG. 9 is a simple graph of speed droop or reduction in speed in rpm for a representative family of fuels of varying volatility or driveability index value. This data was generated in a given engine family during cold start. Engine speed droops were measured for each fuel type, and they were plotted versus their driveability index value at the given temperature. In this case, the cold start temperature at which the data was accumulated was 50° F., a salient cold start temperature. Usually, the temperature range of interest is from −50° F. to +120° F. In this embodiment of this invention, this curve, which relates DI (or alternatively, volatility) values of fuels with speed droop, is known as the D-curve (D stands for detection). The detection phase is of prime importance in the context of the present invention.

Figure 8:
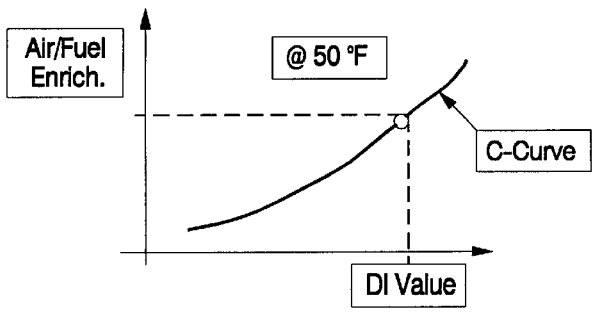
FIG. 8 is a typical graph of required air/fuel enrichment for good vehicle driveability during cold start transition, at any given temperature, with varying fuel volatility (DI values). This constitutes the C-curve table lookup (here C stands for Compensation) for future references by the ECM.

Referring then to FIG. 8, a graph is prepared experimentally for an engine family at any given test temperature (e.g., 50° F.) and for each fuel type to determine the optimum amount of air/fuel enrichment during the cold start phase where both minimum emissions and good driveability are simultaneously achieved. Thus, in the vertical axis, correct air/fuel enrichment data is obtained for the type of fuels with varying volatilities and plotted according to their driveability index value. In accordance with this embodiment of the invention, this curve is known as a C-curve (C stands for compensation).

Specific Example of an Algorithm to Detect and Compensate for Fuel Volatility

In the following illustration of a preferred embodiment of the invention, the passage of time is often represented as a progressive count of engine events rather than being expressed in terms of seconds or fractions of a second. This is because the study of engine cold-start transition period is better understood in terms of engine events and is usually completed in less than about 100 such events.

As stated above, an engine event is the time between successive equivalent operations in two cylinders, operations such as successive spark ignitions or fuel injections. As is known, such successive events do not necessarily occur in adjacent cylinders in the engine block. For a four-cylinder engine at 3000 rpm, the time interval between two engine events is 10 milliseconds. In the operation of a six-cylinder engine, for example, there are normally three ignition events for each revolution of the crankshaft of the engine. The microprocessor that is controlling such engine operations receives signals from the crankshaft position sensor (CPS) three times for each crankshaft revolution. Two full revolutions of the crankshaft are required for a complete cycle of a four-stroke internal combustion engine. Thus, there are normally six fuel injection events and six ignition events in a full cycle of a four stroke, six cylinder engine.

The engine control microprocessor typically receives, at least, a signal from the crankshaft position sensor at every event. This signal is known as the 3X reference-pulse (for a V6 engine) by engine control module programmers. The 3X signal enables the ECM to know the position of the crankshaft and, thus, the position of each piston in each cylinder for controlling the timing of fuel injections and ignitions. Furthermore, since the microprocessor's clock can time the period between engine events, the micro processor can calculate engine speed in revolutions per minute, rpm, at each such 3X, or equivalent, CPS signal. In other words, the ECM can calculate an engine rpm following a 3X signal and within a small fraction of the time before the next signal.

Figure 10:
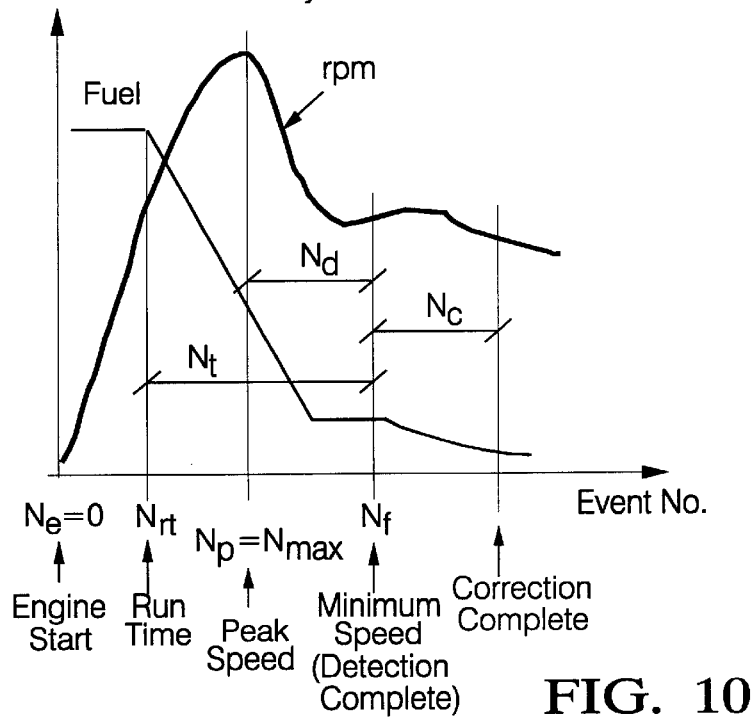
FIG. 10 is a conceptual graph illustrating the salient events in engine speed and fuel injection in the cold start analysis of rpm signal during the practice of the algorithm illustrated in FIGS. 11–15.

FIG. 10 is a conceptual graph of engine rpm versus engine event number similar to FIG. 3. It is also a conceptual graph of the fuel mass injected versus engine event number. The purpose of FIG. 10 is to illustrate a nomenclature that is used in the following flow charts illustrating the fuel volatility detection and compensation algorithm exemplifying one embodiment of this invention. The following nomenclature is used in referring to FIG. 10.

Events Terminology $N_e$=Engine event counter from start $N_{rt}$=Event designating transition to run-time mode $N_{max}$=Event designating location of maximum speed $N_p$=Event designating peak speed (=$N_{max}$)

$N_d$=Size of detection window from the location of peak speed $N_p$ (typically 20–24 events)

$N_t$=Size of detection window from run-time $N_{rt}$ (also called "detection horizon" typically 24–30 events)

$N_f$=Event number for final (minimum) speed determination (by which time the fuel volatility detection is completed)

$N_c$=Size of fuel compensation window after $N_f$ (typically 1 event for fuel enrichment or 20–60 events for fuel enleanment)

The graph of FIG. 10 commences with the ignition key turned on and start of engine cranking when the event counter $N_e$ is set to zero and an initial, preprogrammed, relatively high level of fuel is injected. ECM calculated engine speed may exhibit fluctuations for a number of events during cranking. After engine speed is maintained above a certain level, usually 500 rpm or so, for sufficient number of events, the microprocessor records the current event number as $N_{rt}$ which designates the beginning of the engine run mode. The ECM then begins to reduce the rate of fuel injection over the next few injection events in accordance with its preprogrammed cold start mode of operation. As fully described with respect to FIG. 3, engine rpm peaks after engine start and then experiences a speed droop depending upon the actual volatility, or equivalently the driveability index DI, of the fuel used. In accordance with this invention, the ECM then looks for peak speed over the next few engine events and then determines the amount of speed droop immediately following the peak speed.

In this example, the microprocessor is provided with a preset number of engine events, $N_t$, following engine start, $N_{rt}$, within which number of events, or detection window, the ECM seeks to identify the peak speed event, $N_p$, and completes the detection of the minimum speed, $N_f$. $N_d$ is the size of the detection window in engine events from the location of peak speed until the minimum speed is detected, typically about 20 to 24 engine events.

Due to the volatility of the fuel used, the engine quickly reaches a maximum rpm which is detected at engine event $N_p=N_{max}$, and thereafter engine speed decreases. It decreases over an interval $N_d$, which is the period of engine events in which the microprocessor is analyzing the 3X signals from the crankshaft sensor and seeking to determine a minimum speed before event $N_f$ is over. The difference between the maximum and minimum speeds in this detection window can be compared with the experimentally obtained table look-up values stored in the ECM to reliably estimate the volatility of the fuel that is actually being injected into the intake port of the engine. The detection process is usually completed in a fraction of a second after the run mode is flagged.

At the completion of the volatility detection period $N_f$, a period begins when correction is made, in an open-loop fashion, to the amount of fuel being injected if the engine is overly enriched or enleaned. That period is shown on the graph in FIG. 10 as $N_c$. The fuel compensation process is usually completed in the next event if further enrichment is required. Otherwise, for further fuel enleanment, it is preferred to produce a gradual fuel reduction over a number of events to avoid any sudden cylinder fuel deprivation. This normally can be achieved between 20 to 60 events. In general, this process of detecting speed droop, assessing actual fuel volatility and adjusting the preprogrammed fuel injection rate for the actual fuel properties is completed within a second or two after the engine run time flag is set.

Figure 11:
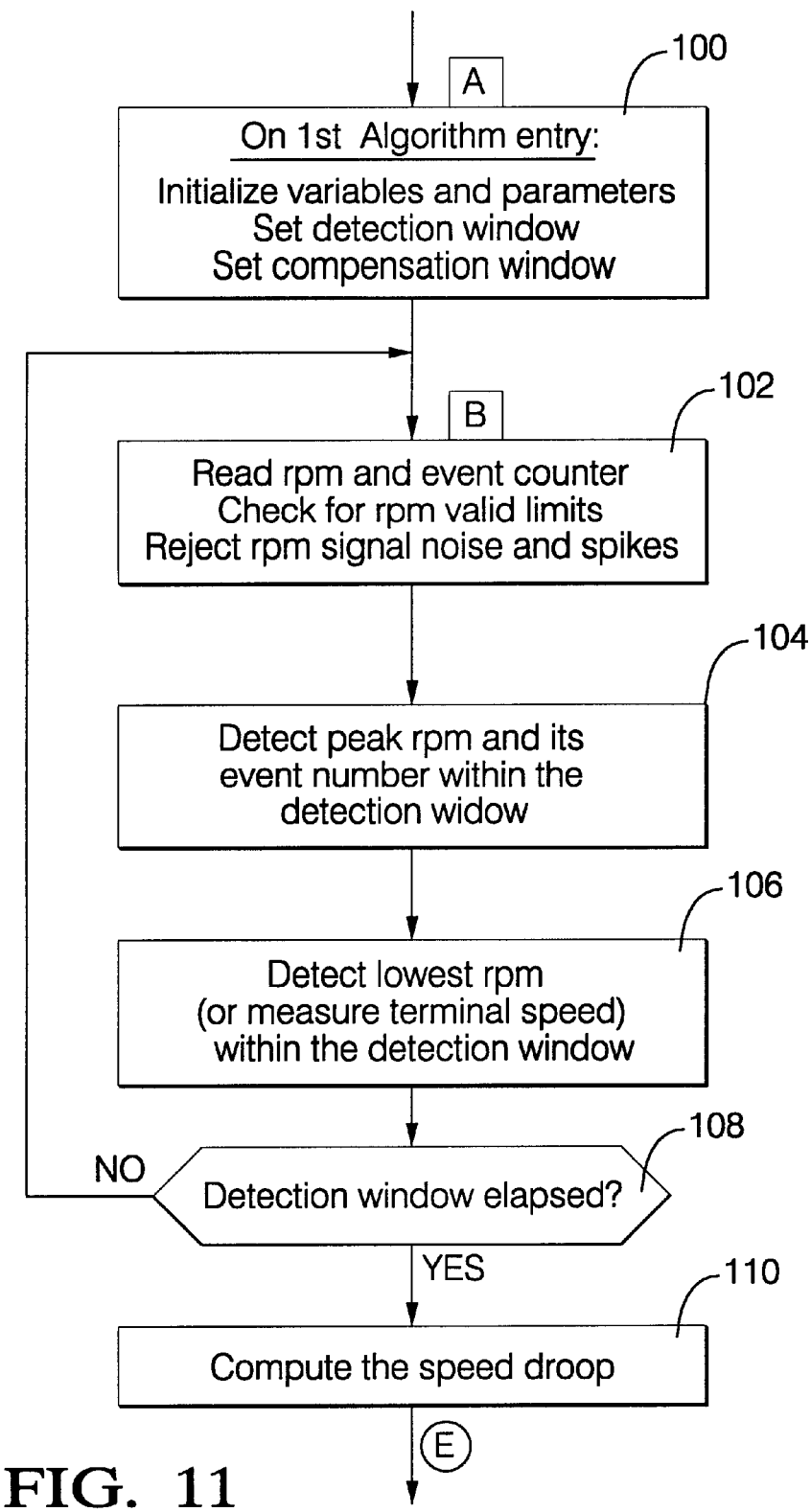
FIG. 11 is a flow diagram summarizing a portion of the algorithm fully illustrated in FIGS. 12–15.

FIG. 11 is a flow diagram summarizing the processing steps of this invention that are carried out in the ECM or PCM in parallel with its cold start transition open loop engine control program. Block 100 summarizes the steps taken by the microcomputer upon the algorithm's first entry. Block 100 also coordinates with portions of the succeeding flow diagrams (FIGS. 12–15) describing this exemplary algorithm in more detail. Portion A of block 100 corresponds to the A portion of the flow diagrams in FIG. 13.

In block 100, certain variables and parameters used in detecting the speed droop associated with the fuel being used are set. The computer at that time also sets the detection window of engine events, $N_t$, and the compensation window, $N_c$, during which the air-to-fuel ratio can be compensated in accordance with this invention.

Figure 13:
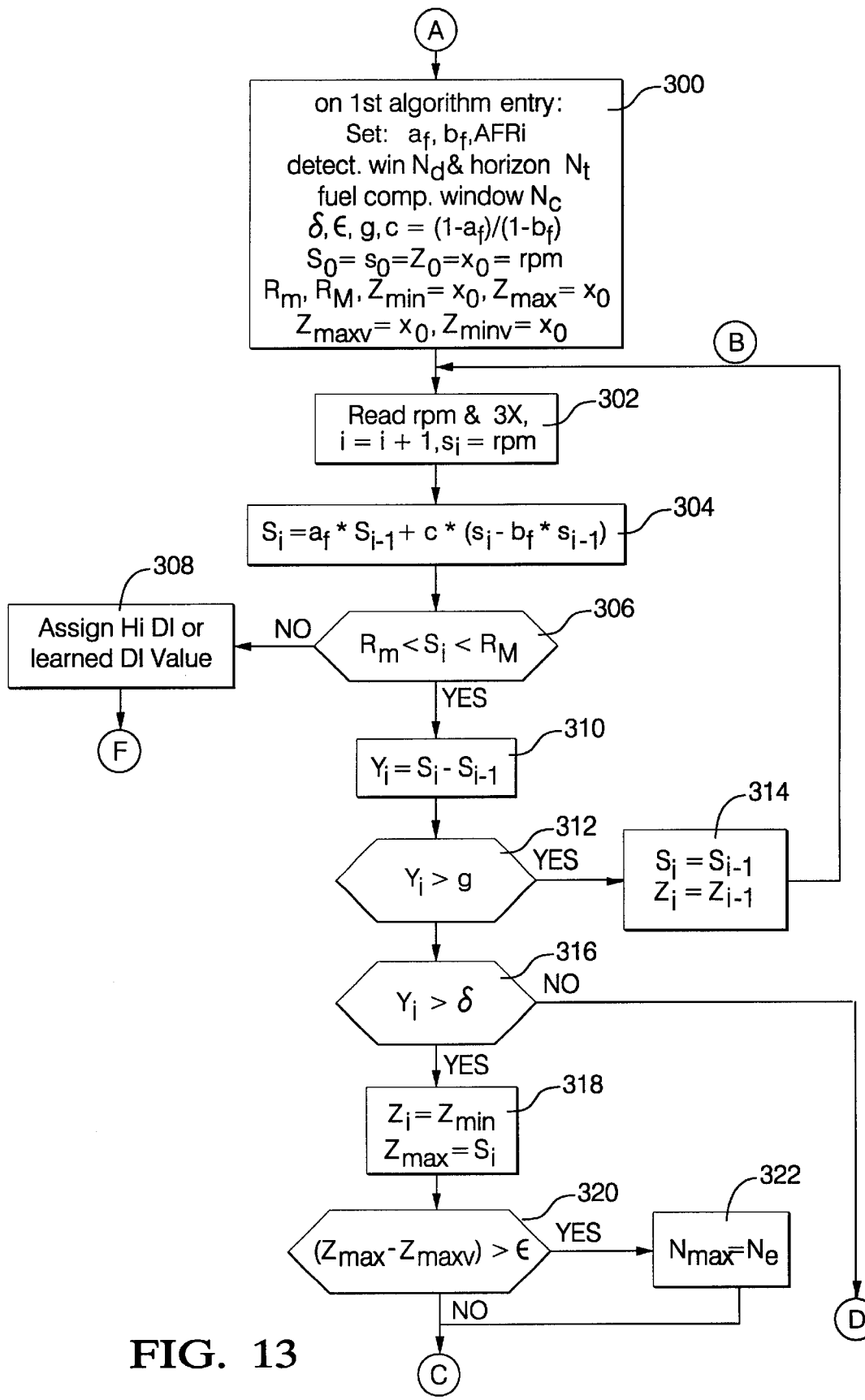

In block 102, which is also associated with step B in FIG. 13, the microprocessor reads the engine rpm upon entry of the detection period and reads the event counter. It checks the rpm for valid limits and imposes data processing steps to reject possible signal noise and spikes in the rpm data based upon 3X signal from the crankshaft position sensor for a V6 engine. The summary algorithm then proceeds to block 104. In block 104, the microprocessor, upon receiving crankshaft position sensor data, detects the peak rpm and its event number. It determines whether the peak rpm has occurred within a permissible detection window. If so, the algorithm in general then proceeds to block 106 in which the lowest rpm following the peak rpm is detected within the detection window, provided that the time permitted for the practice of this process has not elapsed in accordance with query block 108. The microprocessor proceeds to compute the speed droop which is in accordance with the processing steps in the detailed flow diagrams which follow. As described above and below, the computed value of speed droop is compared with look-up table data to estimate fuel volatility and any appropriate compensation in operating fuel enrichment or enleanment.

The following table defines certain initial parameters and values that are used in the algorithm depicted in FIGS. 12–15.

Figure 12:
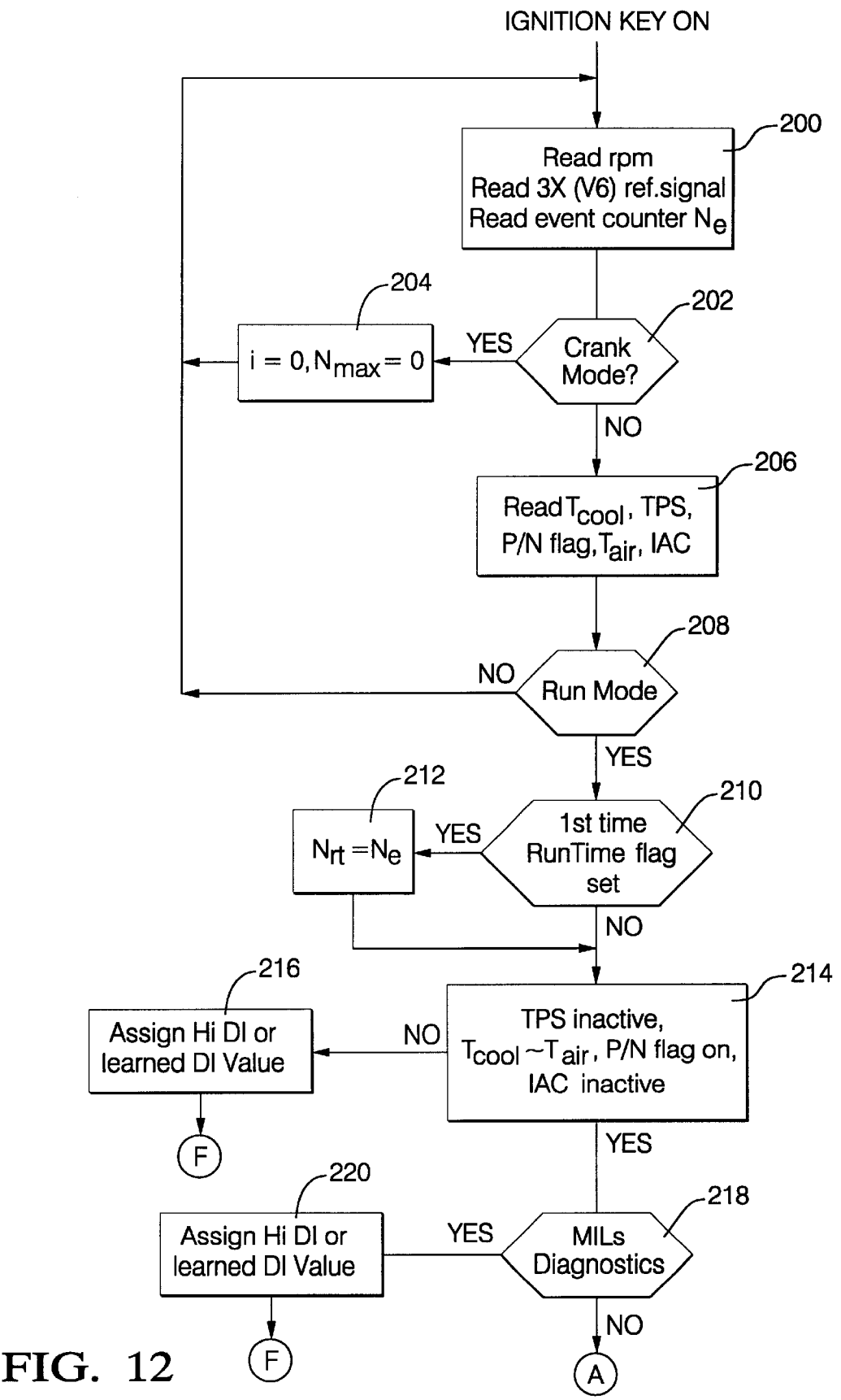
FIGS. 12–15 are flow diagrams of the algorithm for the practice of this invention.

Algorithm Initial Parameters & Values Definitions $a_f$ and $b_f$=rpm filter constants (typically $a_f$=0.68, $b_f$=0)
AFRi=Initial air-fuel ratio used before the detection is completed
δ=Threshold for speed change (typically 1–5 rpm)
ε=Threshold for reduced data (rpm) change (typically 1–5 rpm)
$R_m$ and $R_M$=Minimum & maximum valid speed range, resp. (typically 600 and 2000 rpm, resp.)
g=Maximum allowable rpm spike due to noise (typically 100 rpm)
s=Raw rpm signal (also used as variable x)
S=Filtered rpm signal
Z=Reduced rpm signal (recording significant local maximum and minimum)
$S_o$, $s_o$, $Z_o$, $x_o$=Initial rpm for subscripted variables S, s, Z and x, resp. to start the algorithm
$Z_{max}$ and $Z_{min}$=local maximum and minimum in the reduced rpm data, resp.
$Z_{maxv}$ and $Z_{minv}$=global maximum and minimum rpm in the detection window, resp.
Y=Successive filtered rpm change
W=Successive rpm change in the reduced data set Z
SDRP=Speed droop FIGS. 12–15 are series of interconnected and detailed flow diagrams that illustrate the practice of a preferred embodiment of this invention. Referring first to FIG. 12, when the ignition key is turned on, the microprocessor is activated and engine cranking begins. In process step 200, the microprocessor calculates engine rpm upon receipt of each crankshaft sensor event signal. It receives three signals per revolution of the crankshaft in a V6 engine. As explained, this signal is known in the art as 3X signal. The sequence and relevant data of and for each engine event is temporarily stored in the microprocessor memory. Similarly, in an L4 and V8 engine, appropriate signals are 2X and 4X, respectively.

The process proceeds to crank mode query block 202. In query block 202, the microprocessor, based on a pre-specified value of rpm such as, for example, 500 rpm, determines whether the engine has attained run mode. If the engine has not reached a sufficiently high and stable rpm to be considered in the run mode, the query is answered yes, Y, and the process proceeds to block 204. In process block 204, since the engine is not considered running, the index counter i is reset to zero and the number of events for maximum speed detection is also set to zero. The process cycles between blocks 200, 202 and 204 until such time as the microprocessor is satisfied that the engine has exited the crank mode, whereupon the process proceeds to block 206.

Upon establishing engine run mode, the microprocessor reads the temperature from the engine coolant sensor and records that data, $T_{cool}$, in block 206. It reads the throttle position sensor, TPS; it reads the transmission park/neutral flag from the transmission shift actuator to determine that the transmission is indeed in neutral or park; it reads the air temperature $T_{air}$; and it records the idle air control (IAC) level. The query then proceeds to block 208 where the microprocessor again cycles until it is satisfied that the engine has entered the run mode.

At this point, the process proceeds to block 210, a query block in which the microprocessor determines whether this is the first time that it has determined that the run time flag is set. If it is, it then sets the engine run time event counter $N_{rt}$ to the current event counter $N_e$. This step is illustrated in step 212.

After the ECM is satisfied that the run time flag is set, the process then proceeds to process block 214. Here the ECM determines that the throttle has not been activated by the vehicle operator and that the engine is in its truly cold start mode. The microprocessor also determines that the engine is not warmed up, i.e., that the temperature of the coolant is approximately the same temperature of air being inducted into the engine. The microprocessor also determines that the transmission control lever is in neutral or park and that the idle air control IAC is steady, that is, that the air induction process is not affected by IAC valve dynamic activation. If the microprocessor does not recognize a cold-start condition in which it can enter its preprogrammed transition mode of operation, it proceeds to block 216. In block 216, it simply assigns a conservative value for a high DI fuel, or it proceeds with an acceptable learned driveability index value and does not enter the process of this invention on this engine start attempt.

However, if the microprocessor determines that all of the cold start bases for entering the detection process of this invention have been met, it proceeds to query block 218 in which it determines whether the vehicle's malfunction indicator procedure has diagnosed any faults. If the answer to that query is yes, it proceeds to process block 220, which is a block like 216, and assigns a suitable fuel driveability index and lets the engine proceed to warm up in accordance with prior art practices. However, if no diagnostic failure is detected, the process then proceeds to commence execution of the subject algorithm. It proceeds to process sequence "A" commencing with block 300 at the top of FIG. 13.

In FIG. 13, subroutine A, block 300, represents the entry into the engine event-based driveability index detection and compensation algorithm which is the basis of this invention. Upon entry into block 300, values are set for certain constants and parameters utilized in the driveability index detection and compensation process. The process involves the calculation of engine speed in rpm by the ECM from crankshaft position sensor (CPS) signal and the determination of maximum and minimum values of rpm within a certain number of engine events, a detection window.

The rpm signal calculated from the CPS may be subject to electronic noise or normal fluctuations in engine speed that require filtering before use. The filtering process is a mathematical process carried out by the microprocessor. Referring to block 300, $a_f$ and $b_f$ are data filter constants that are applied in the calculation of engine rpm. The constants $a_f$ and $b_f$ are typical of constants that are used in the analysis of the noisy voltage output of a sensor like a crankshaft sensor. Typically, $0 \leq a_f < 1$ and $0 \leq b_f < 1$.

Other parameters are initialized in block 300. Many of these parameters are identified in the above table. The pre-calibrated value of cold start air-to-fuel ratio, AFRi, is stored for use in this process. Values are set for the size of the test window, $N_t$, typically 24 to 30 events; the detection window, $N_d$, typically 20 to 24 engine events; and for the size of the fuel compensation window, $N_c$, typically either one event (for fuel enrichment) or 20–60 events (for enleanment) after $N_t$. Values for the parameters $\delta$ and $\epsilon$ are established. The scalar parameter $\delta$ is the threshold before the microprocessor will recognize a speed change, typically 1 to 5 rpm, and $\epsilon$ is the threshold before a change is recognized in the value of the reduced data for rpm. Again, a typical value for $\epsilon$ is 1 to 5 rpm. A value for g is established. g is the maximum allowable spike in rpm due to signal noise from the crankshaft position sensor. A value for filter constant c is computed from the equation indicated in block 300.

The values for the initial filtered rpm signal $S_o$, the initial raw rpm signal $s_o$, the local minimum and maximum values in the reduced rpm data and other variables shown are all set initially to the present calculated value of rpm. The process proceeds to block 302.

In block 302, the microprocessor reads the current rpm from its memory that was computed using 3X reference-pulse signal (for V6) from the crankshaft position sensor. Similarly, 2X and 4X signals are read in for L4 and V8, respectively. The index counter, i, is incremented, and the present calculated value for rpm is stored in the memory location as the present raw rpm signal $s_i$.

The process proceeds to block 304 in which the present value of $s_i$, is converted to a filtered rpm signal $S_i$ in accordance with the equation set forth in block 304.

The process proceeds to query block 306 in which the present filtered rpm signal is tested to see if it is within an acceptable range of speed values ($R_m$, $R_M$). The current filtered rpm value is compared with the pre-established values for minimum and maximum valid cold start transition speed, respectively. These values are typically from about 600 to 2000 rpm. If the current value of the filtered rpm signal $S_i$ does not lie within the expected range, the algorithm is stopped and the process proceeds to block 308. In this block, pre-specified values for high DI fuel are assigned in the ECM or PCM and the process is formally closed, reverting to the open loop operation for transient cold start.

If the answer in query block 306 is positive, the process proceeds to block 310. In block 310, the successive changes $Y_i$ in filtered rpm are calculated. The process proceeds to block 312 in which the magnitude of change $Y_i$ in filtered rpm is tested as to whether it is greater than a maximum allowable rpm spike level, the scalar value g. If there has been an overly large rpm spike and the answer to the query in block 312 is yes, the values for the filtered rpm signal, $S_i$, and the reduced rpm signal, $Z_i$, are held steady in block 314, and the process recycles to block 302. In other words, excessive changes in filtered rpm, $Y_i$, are discarded and the process proceeds to the next CPS signal and ECM calculation.

However, if the change in filtered rpm $Y_i$ is upper bounded by the scalar value, g, the process proceeds to block 316 in which the change in rpm value is tested against a minimal threshold change of a few rpm, $\delta$. If the change in filtered rpm has exceeded a minimal threshold change, the process proceeds to block 318, else the change is assumed insignificant and is proceeded to block 400 (Step D). In block 318, the current reduced rpm data $Z_i$ is taken as the previously set minimum value $Z_{min}$ and the current value for filtered speed is set as the present $Z_{max}$ value. The value then proceeds to block 320.

In block 320, which is a query block, the microprocessor determines whether the local maximum in rpm ($Z_{max}$) is greater than the previously determined global maximum value $Z_{maxv}$ by a preset constant E. If it is greater, then the process proceeds to block 322 in which the value of event $N_{max}$ is updated to the current value of event counter $N_e$ following an engine run mode detection. If the local max does not exceed the global max by the constant $\delta$, the process proceeds to subroutine C (block 406) in FIG. 14.

Figure 14:
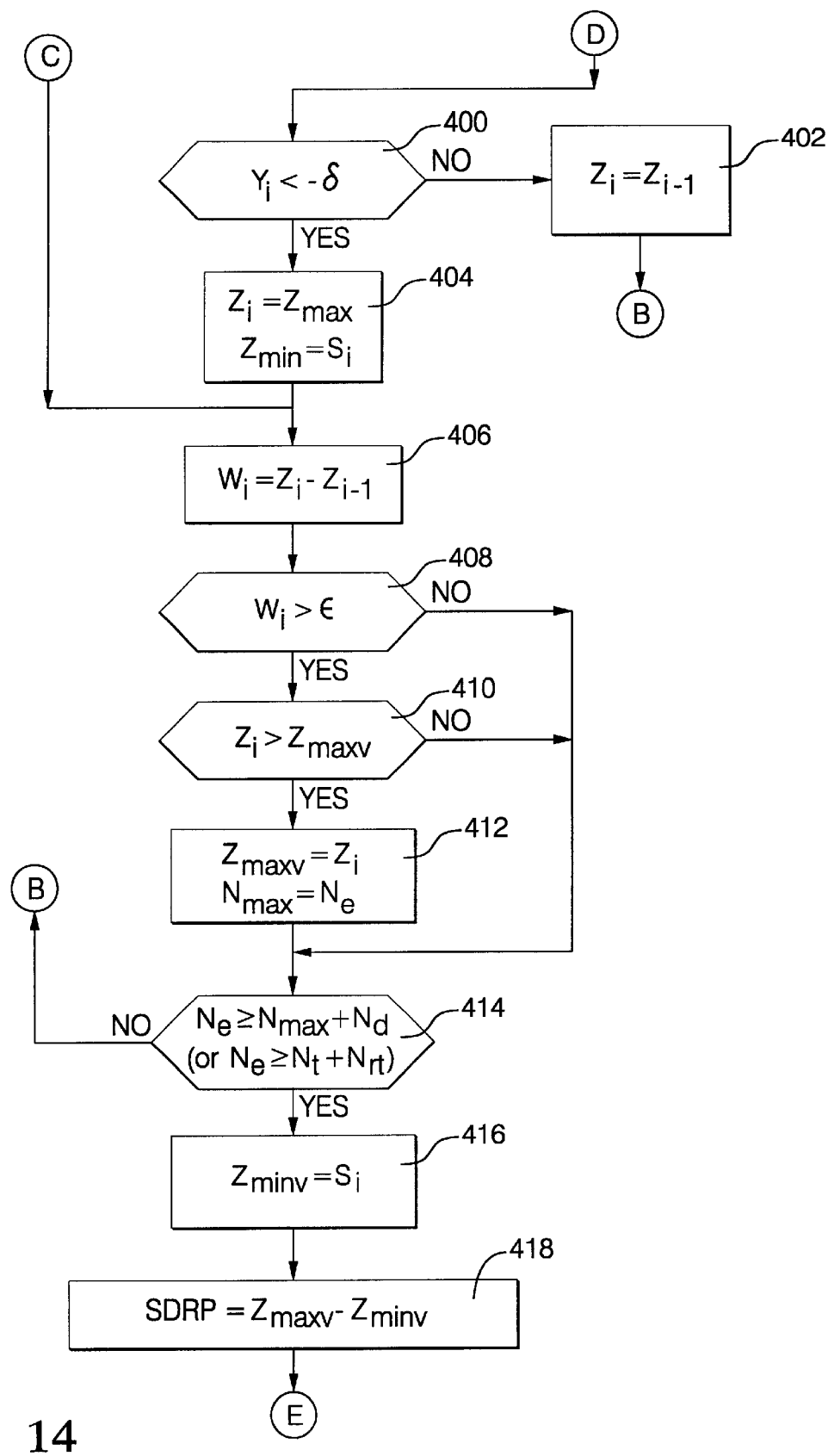
Figure 15:
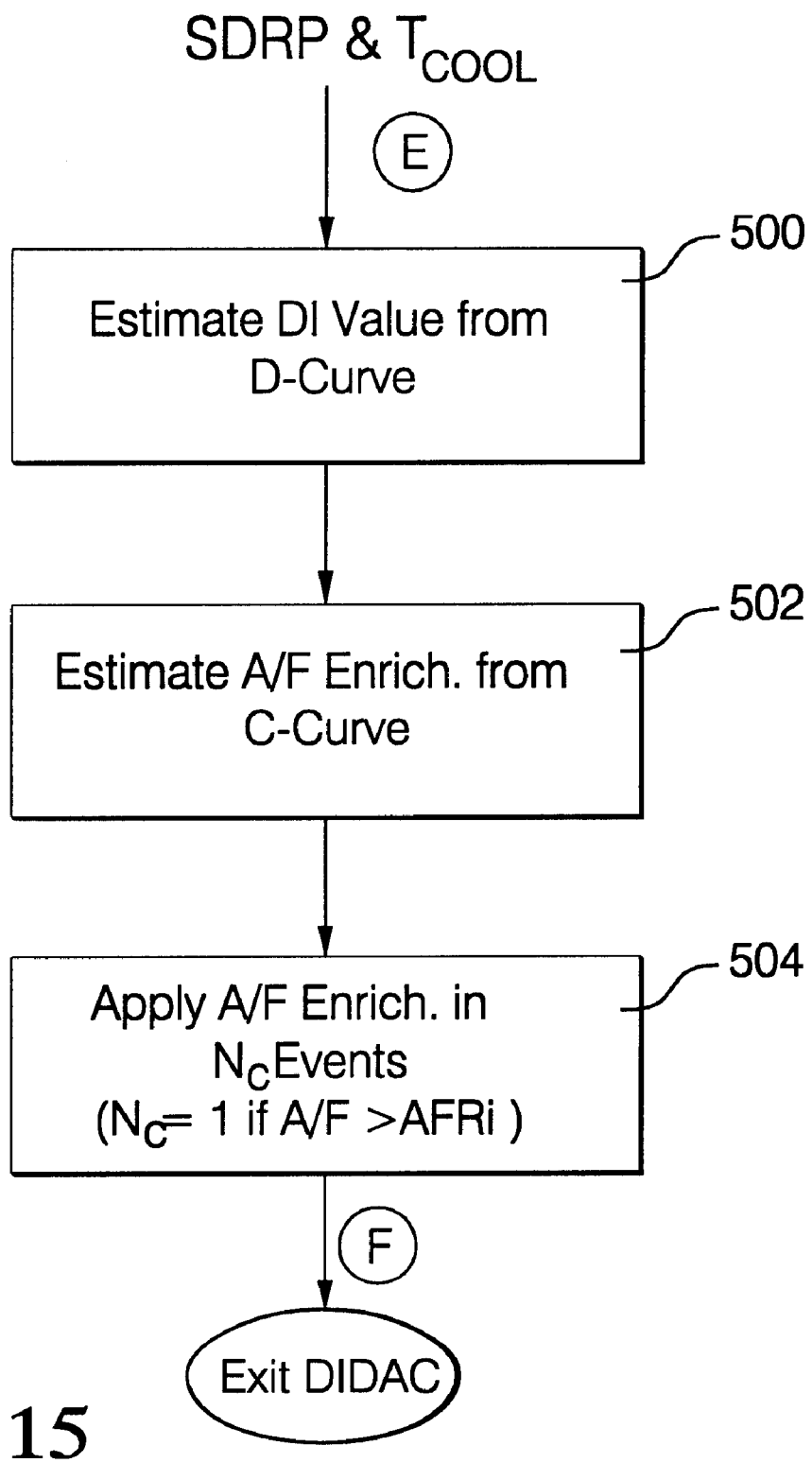

Referring to FIG. 14, the uppermost portion of the flow diagram commences subroutine D. In subroutine D at query block 400, the current value of filtered rpm change is tested to see if it is less than a negative value for threshold speed change. If it is not, the process proceeds to block 402 in which the current value in reduced rpm is held steady, and the process proceeds to block 302 in step B.

In the event that in query block 400 the current value of speed change is less than the negative value of $\delta$, the process proceeds to block 404. In block 404, the current value of reduced rpm data $Z_i$ is set as $Z_{max}$ and the current minimum speed $Z_{min}$ is set as the current filtered rpm value. Subroutine C enters below block 404 and begins at block 406. In block 406, the successive rpm changes in the reduced rpm data are set to the difference in the current and previous values of reduced rpm signal. The process moves to block 408. In block 408, the value of the successive rpm change $W_i$ is tested to see if it is less than the threshold for reduced data change $\delta$. If the answer to the query is positive, the process proceeds to block 410. If not, the process proceeds to block 414.

In block 410, the current reduced rpm data $Z_i$, is compared to previous maximum value $Z_{maxv}$ to determine if a new higher value for rpm is reached. If the test is positive, the process moves to block 412, otherwise the process flows to block 414. In block 412, the current maximum value of reduced rpm data is set to the current value $Z_i$ and the location of the current peak speed is set to the current event counter $N_e$. In block 414, the event counter $N_e$ is tested for the detection window expiration.

Referring to FIG. 10, two techniques for speed droop determination involve (1) the determination of local significant speed reversal designating the actual local minimum speed $N_t$ events after the engine starts running, and (2) approximate calculation of minimum speed at $N_d$ events after peak speed has been reached. In block 414, the event counter is tested for expiration of the detection window by either technique. If the detection window is not exceeded, the algorithm transfers to subroutine B for further execution. Otherwise, the control is transferred to block 416 where the minimum speed value $Z_{minv}$ is set to the current terminal value of filtered rpm. The actual speed droop SDRP is then calculated in block 418 as the difference between maximum value $Z_{maxv}$ and minimum value $Z_{minv}$ over the specified detection window. At this stage, the detection phase is complete and computations proceed to block 500 subroutine E in FIG. 15.

With speed droop thus calculated and with the measured coolant temperature, the fuel compensation phase is entered. Block 500 in FIG. 15 includes the D-curve which has the experimental table lookups for any given engine family (L4, V6, V8, etc.) characterized by measured speed droop for any specified fuel DI at a specific temperature (−50° F. to +120° F.). By using the measured speed droop and coolant temperature, the actual value of fuel volatility represented by its DI value is determined. Block 502 has the experimental table lookups for the required degree of air/fuel enrichment versus fuel DI value in the form of C-curves. In block 502 using the estimated DI value from block 500 and the measured coolant temperature, the required degree of fuel enrichment is determined. The process then proceeds to block 504 in which the determined value of air-to-fuel enrichment in block 502 is applied. This is done instantly if the required air-to-fuel ratio compensation is greater than the initial air-to-fuel ratio preset in the microprocessor for the cold engine start. Otherwise, for further enleanment, the fuel is gradually cutback over the compensation window of length $N_c$. The process then exits the algorithm and is complete.

The process illustrated with reference to FIGS. 12–15 made use of the determination of speed droop, SDRP, to detect the volatility of the fuel used during cold start. However, as stated above, other practices such as calculating and analyzing changes in the time rate of change (acceleration) of speed values, to determine global or local peak and minimum acceleration values, may also be used as described with reference to FIGS. 6 and 7. Also while the major effort has been on the determination of the optimum degree of enrichment for the fuel used, other methods such as modifying the shape and duration (decay rate) of fuel enrichment signal are of use in the context of the present invention. The method discussed here also detects fuel volatility on every engine ignition. But it is also conceivable to memorize the learned values for references by ECM in future ignition cycles so long as the fuel tank has not been topped up.

While the invention has been described in terms of a few specific embodiments, it is apparent that other forms could readily be adapted by persons skilled in the art. Accordingly, the scope of the invention is limited only by the following claims.

What is claimed is:

1. A method for cold start of a gasoline fueled, multi-cylinder, internal combustion engine in an automotive vehicle; said vehicle comprising an engine control module containing a programmed microprocessor for controlling fuel delivery to said engine and timing the ignition of said fuel in the cylinders of said engine, an engine speed sensor for providing engine speed data to said microprocessor, a fuel tank with gasoline of unknown volatility properties and a vehicle operator activated starter motor for cranking said engine for starting; said engine comprising at least one fuel injector for receiving fuel from said fuel tank and delivering fuel to said cylinders, said method being executed under the control of said microprocessor and comprising upon cranking of said engine, initiating delivery of said fuel to said cylinders by one or more said injectors at a first pre-calibrated fuel-rich rate and initiating ignition to achieve engine running operation, sensing the speed of said engine to detect commencement of engine running operation, upon sensing engine running operation, reducing the rate of delivery of said fuel to a second pre-calibrated fuel rate, sensing speed values of said engine over subsequent cylinder ignition events to detect a peak engine speed value and a minimum engine speed value lower than said peak value, calculating the difference in engine speed between said peak value and minimum value, and using said difference as a measure to determine the volatility properties of said fuel.

2. A method for cold start as recited in claim 1 comprising setting a detection window of engine events within which to detect said peak value and a minimum or terminal speed value within said window.

3. A method for cold start as recited in claim 1 comprising adjusting said pre-calibrated fuel-rich injection rate to a fuel injection rate based on the volatility properties determined for said fuel.

4. A method for cold start as recited in claim 2 comprising adjusting said pre-calibrated fuel-rich injection rate to a fuel injection rate based on the volatility properties determined for said fuel.

5. A method for cold start of a gasoline fueled, multi-cylinder, internal combustion engine in an automotive vehicle; said vehicle comprising an engine control module containing a programmed microprocessor for controlling fuel delivery to said engine and timing the ignition of said fuel in the cylinders of said engine, an engine speed sensor for providing engine speed data to said microprocessor, a fuel tank with gasoline of unknown volatility properties and a vehicle operator activated starter motor for cranking said engine for starting; said engine comprising at least one fuel injector for receiving fuel from said fuel tank and delivering fuel to said cylinders, said method being executed under the control of said microprocessor and comprising upon cranking of said engine, initiating delivery of said fuel to said cylinders by one or more said injectors at a first pre-calibrated fuel-rich rate and initiating ignition to achieve engine running operation, sensing the speed of said engine to detect commencement of engine running operation, upon sensing engine running operation, reducing the rate of delivery of said fuel to a second pre-calibrated fuel rate, sensing speed values of said engine over subsequent cylinder ignition events, calculating the time rate of change of said engine speed to detect at least one peak value and one minimum value on the said rate of speed change values, and using said peak value and said minimum value as a measure to determine the volatility properties of said fuel.

6. A method for cold start as recited in claim 5 comprising calculating the difference between said peak and minimum rate of speed change values over a specified detection window and using the said difference value as a measure of the volatility properties of said fuel.

7. A method for cold start as recited in claim 5 comprising sensing speed values of said engine over subsequent cylinder ignition events, calculating the time rate of change of said engine speed to detect the number of zero-crossings on the said rate of speed change values over a specified detection window, and using the said number of zero-crossings as a measure to determine the volatility properties of said fuel.

8. A method for cold start as recited in claim 5 comprising adjusting said pre-calibrated fuel-rich injection rate to a fuel injection rate based on the volatility properties determined for said fuel.

9. A method for cold start as recited in claim 6 comprising adjusting said pre-calibrated fuel-rich injection rate to a fuel injection rate based on the volatility properties determined for said fuel.

10. A method for cold start as recited in claim 7 comprising adjusting said pre-calibrated fuel-rich injection rate to a fuel injection rate based on the volatility properties determined for said fuel.

11. A method for cold start as recited in any of claims 1–10 comprising determining the volatility properties of said fuel by comparing said difference in engine speed or time rate of change of said speed with a correlation of such differences with the known volatility properties of reference gasolines stored in the memory of said module.

12. A method as recited in any of claims 3, 4 or 8–10 comprising adjusting said pre-calibrated fuel injection rate by reference to a correlation of fuel injection rates with the known volatility properties of reference gasolines stored in the memory of said module.

* * * * *